(12) United States Patent
Huang et al.

(10) Patent No.: US 11,803,167 B2
(45) Date of Patent: Oct. 31, 2023

(54) ENERGY SERVICE SYSTEM OF MULTI-MACHINE PRODUCTION LINE AND DESIGN METHOD OF SHARED DRIVE SYSTEM

(71) Applicant: HEFEI UNIVERSITY OF TECHNOLOGY, Anhui (CN)

(72) Inventors: Haihong Huang, Anhui (CN); Xiang Zou, Anhui (CN); Lei Li, Anhui (CN); Libin Zhu, Anhui (CN); Zhifeng Liu, Anhui (CN)

(73) Assignee: HEFEI UNIVERSITY OF TECHNOLOGY, Anhui (CN)

( * ) Notice: Subject to any disclaimer, the term of this patent is extended or adjusted under 35 U.S.C. 154(b) by 289 days.

(21) Appl. No.: 17/324,919

(22) Filed: May 19, 2021

(65) Prior Publication Data

US 2021/0271216 A1 Sep. 2, 2021

Related U.S. Application Data

(63) Continuation of application No. PCT/CN2020/101323, filed on Jul. 10, 2020.

(30) Foreign Application Priority Data

Dec. 4, 2019 (CN) .......................... 201911224825.0
Dec. 4, 2019 (CN) .......................... 201911224857.0

(51) Int. Cl.
  *G05B 17/02* (2006.01)
  *H02J 4/00* (2006.01)
(52) U.S. Cl.
  CPC ................ *G05B 17/02* (2013.01); *H02J 4/00* (2013.01)

(58) Field of Classification Search
  CPC .......... G05B 17/02; G05B 2219/32021; G05B 19/418; H02J 4/00; Y02P 70/10; Y02P 90/02; G06Q 10/06
  See application file for complete search history.

(56) References Cited

U.S. PATENT DOCUMENTS 5,272,428 A    12/1993  Spiegel
10,581,974 B2 *  3/2020  Sustaeta ............ G05B 13/0265
(Continued)

FOREIGN PATENT DOCUMENTS

CN            104049600 A      9/2014
CN            104175597 A     12/2014
(Continued)

OTHER PUBLICATIONS

Wang Qingyang et al., "Energy-saving optimization method of stamping," Forging and Stamping Technology, Jun. 2019, pp. 134-144, vol. 44, No. 6.

(Continued)

*Primary Examiner* — Chad G Erdman

(57) ABSTRACT

Disclosed are an energy service system of a multi-machine production line and a control method thereof, the method includes reorganizing respective machines in the production line into three types of controllable entities: a drive system, an energy supply bus and an execution device, equipping them with a control center, and selecting a sub-drive system that is idle and is capable of completing the work stage with high energy efficiency to supply energy service for the corresponding execution device through the energy supply bus. Further disclosed is a design method of a multi-machine shared drive system of a production line, which increases the number of basic flow units of each drive unit to a maximum value one by one, and coordinates action time to form a variety of scheduling schemes, and selects a configuration (Continued)

scheme whose total time and total energy consumption are less as the shared drive system.

2 Claims, 3 Drawing Sheets

(56) References Cited

U.S. PATENT DOCUMENTS

| 2005/0209798 | A1 | 9/2005 | Ranta |
|---|---|---|---|
| 2005/0258795 | A1 | 11/2005 | Choi |
| 2006/0276948 | A1 | 12/2006 | Toda |
| 2014/0244051 | A1 | 8/2014 | Rollins |

FOREIGN PATENT DOCUMENTS

| CN | 104179735 | A | | 12/2014 |
|---|---|---|---|---|
| CN | 104756022 | A | | 7/2015 |
| CN | 105074231 | A | | 11/2015 |
| CN | 105673603 | A | * | 6/2016 |
| CN | 105673603 | A | | 6/2016 |
| CN | 106499614 | A | | 3/2017 |
| CN | 107420378 | A | | 12/2017 |
| CN | 107730152 | A | | 2/2018 |
| CN | 108614538 | A | | 10/2018 |
| CN | 109787275 | A | | 5/2019 |
| CN | 110242531 | A | | 9/2019 |
| CN | 110889639 | A | | 3/2020 |
| CN | 110968059 | A | | 4/2020 |
| EP | 3 550 482 | A1 | | 10/2019 |
| KR | 20150048261 | A | | 5/2015 |
| KR | 20190093770 | A | | 8/2019 |
| WO | WO2014174928 | A1 | | 10/2014 |

OTHER PUBLICATIONS

Shi et al. "Dynamic Performance Analysis for Hydraulic System Based on Drive-unit Energy Matching Method," Machine Tool & Hydraulics, Jul. 2017, pp. 5-9, 22, vol. 45, No. 13.

Liu Zhifeng et al., "An Energy saving Partition Control Method Drive System for Hydraulic Presses," China Mechanical Engineering, Jul. 2016, pp. 1-7, vol. 27, No. 14.

Lei Li et al., "An Energy-Saving Method by Balancing the Load of Operations for Hydraulic Press," IEEE/ASME Transactions on Mechatronics, Dec. 2017, pp. 2673-2683, vol. 22, No. 6.

Lu Chao, "Study on Theory and Method of Multi-objective Scheduling Problems with Controllable Processing Times," Dissertation Submitted in Partial Fulfillment of the Requirements for the Degree of Doctor of Philosophy in Engineering, Huazhong University of Science & Technology, May 11, 2017, pp. 1-38, China.

Lei Li et al., "A coordinate method applied to partitioned energy-saving control for grouped hydraulic presses," Journal of Manufacturing Systems, Oct. 2016, pp. 102-110, vol. 41.

Medvedev et al., "Energy Properties of Multimotor Electrohydraulic Drives" Russian Engineering Research, Feb. 5, 2012, pp. 1-4, vol. 32, No. 1.

Huang et al., "Energy-Saving Design Method for Hydraulic Press Drive System with Multi Motor-Pumps," International Journal of Precision Engineering and Manufacturing-Green Technology, Mar. 6, 2019, pp. 1-12.

Zhifeng Liu et al., "An Energy Matching Method for Hydraulic Press Group Based on Operation Load Profile," Published in 23rd CIRP Conference on Life Cycle Engineering, Dec. 2016, pp. 219-223, vol. 48.

* cited by examiner

ENERGY SERVICE SYSTEM OF MULTI-MACHINE PRODUCTION LINE AND DESIGN METHOD OF SHARED DRIVE SYSTEM

CROSS-REFERENCE TO RELATED APPLICATION

This application is a continuation of International Application No. PCT/CN2020/101323, filed on Jul. 10, 2020, which claims priority to Chinese Patent Application No. 201911224857.0, filed on Dec. 4, 2019, and Chinese Patent Application No. 201911224825.0, filed on Dec. 4, 2019. All of the aforementioned patent applications are hereby incorporated by reference in their entireties.

TECHNICAL FIELD

The present disclosure relates to the technical field of a multi-machine production line processing, and in particular, to an energy service system of a multi-machine production line and a method thereof, and a design method of a multi-machine shared drive system of a production line.

BACKGROUND

A production line has advantages of high production efficiency, capacity of completing multiple process steps or even all process steps of a part, and is widely used in manufacturing industry. Execution devices in the production line complete production tasks one by one, and implement continuous processing of multiple different process steps. However, in one work cycle of each execution device, energy requirements of different stages are quite different, the energy requirement of an actual processing process is greater than the energy requirement of other auxiliary stage, which leads to a lower matching degree between an energy supply and a load requirement, and results in a large amount of energy loss in the production line.

Furthermore, for each processing process, a contour of a part depends on the previous process and affects the contour for the next process. Therefore, it is very difficult to reduce energy consumption by changing the processing flow.

Hydraulic transmission has become a transmission form of an equipment in a production line due to its advantages of smooth and steady transmission, large power-to-weight ratio, simple control and large bearing capacity. However, in one work cycle in the production line, energy requirements of different process steps and different processing stages are quite different, which leads to a lower matching degree between a drive system and a load requirement, and results in a large amount of energy loss in the production line.

Furthermore, for machines adopted with hydraulic transmission, an existing drive system is designed according to a power requirement of a process, therefore, the installed power of the drive system is relatively large, and the matching degree between the drive system and the load is relatively low, which leads to high energy loss of an equipment of the production line, and the energy efficiency being less than 40%.

SUMMARY

For avoiding the shortcomings existing in the abovementioned prior art, the present disclosure provides an energy service system of a multi-machine production line and a control method thereof, in order to be able to supply energy required tasks for the production line with high energy efficiency and without conflict through an energy supply bus, so as to improve the energy efficiency of the production line, and reduce energy loss in one work cycle of the production line; a design method of a multi-machine shared drive system of a production line is further provided, in order to improve the matching degree between a drive system and a task load of the production line, thereby improving the energy efficiency of the production line, and reducing energy loss in one work cycle of the production line of a hydraulic press.

The present disclosure adopts the following technical solutions to solve the technical problems.

The characteristics of an energy service system of a multi-machine production line of the present disclosure include: a drive system, an execution device, an energy supply bus and a control center.

The drive system is composed of m drive units, $AG=\{AG_1, AG_2, \ldots, AG_i, \ldots, AG_m\}$, and is configured to supply energy for the execution device, wherein $AG_i$ represents the i-th drive unit, $i \in \{1, 2, \ldots, m\}$; a rated power of the i-th drive unit $AG_i$ is recorded as $PR_i$.

The execution device is composed of n execution units, $CL=\{CL_1, CL_2, \ldots, CL_j, \ldots, CL_n\}$, and is configured to complete a processing task in the production line, wherein $CL_1$ represents the j-th execution unit, $j \in \{1, 2, \ldots, n\}$.

The control center is configured to monitor and control on-off state of each drive unit and the energy supply bus.

The energy supply bus is composed of m independent units, and is configured to convert an output energy form of the i-th drive unit $AG_i$ into an energy form required by the j-th execution unit; and each independent unit is made to consist of an inlet A end and an outlet B end, wherein the inlet A end connected to the i-th drive unit $AG_i$ is recorded as $IN_i$; and, the outlet B end corresponding to the i-th inlet A end $IN_i$ has n outlets, which are sequentially connected to the first execution unit $CL_1$ to the n-th execution unit $CL_n$, wherein an outlet connected to the j-th execution unit $CL_j$ is recorded as $OU_{ij}$; and, a switch $SW_{ij}$ is provided on the outlet $OU_{ij}$, and when the switch $SW_{ij}$ is off, the i-th inlet A end $IN_i$ is connected to the outlet $OU_{ij}$, and the i-th drive unit $AG_i$ is capable of supplying energy for the j-th execution unit $CL_j$.

The processing task is made to composed of n subtasks, $TA=\{TA_1, TA_2, \ldots, TA_j, \ldots, TA_n\}$, wherein $TA_j$ represents the j-th subtask; the j-th subtask $TA_j$ completes processing on the j-th execution unit $CL_j$; the j-th subtask $TA_j$ is composed of processing stages with similar power requirements in $k_j$ different processes, wherein a power similarity $Sm_j^\alpha$ of any α-th processing stage is obtained by formula (1), and satisfies formula (2):

$$Sm_j^\alpha = \left( \frac{\int_{st_j^\alpha}^{ct_j^\alpha} Te_j^\alpha Tf_j^\alpha dt}{ct_j^\alpha - st_j^\alpha} \right) \bigg/ \left( \frac{\sum_{a=1}^{k_j} \int_{st_j^\alpha}^{ct_j^\alpha} Te_j^\alpha Tf_j^\alpha dt}{\sum_{a=1}^{k_j} ct_j^\alpha - st_j^\alpha} \right) \quad (1)$$

$$Sm_j^\alpha \in Sy_j \quad (2)$$

in formula (1), $ct_j^\alpha$ and $st_j^\alpha$ are an end time and a start time of the α-th processing stage, $Te_j^\alpha$ is an effort required by the α-th processing stage, $Tf_j^\alpha$ is a flow required by the α-th processing stage, $\alpha \in \{1, 2, \ldots, k_j\}$;

in formula (2), $Sy_j$ is a range of a j-th given power similarity, and between [0, 1].

A process is composed of D process steps {$PRO_1$, $PRO_2$, ..., $PRO_d$, ..., $PRO_D$}, wherein $PRO_d$ represents the d-th process step, the d-th process step $PRO_d$ is made to comprise $k_d$ processing stages, and to satisfy formula (3):

$$\sum_{d=1}^{D} k_d = \sum_{j=1}^{n} k_j. \tag{3}$$

The processing stages of the d-th process step $PRO_d$ are completed sequentially and successively, and satisfies formula (4):

$$ct_d^\alpha = st_d^{\alpha+1} \tag{4}$$

$TAPR_{jd}^{\alpha r}$ is made to represent that the r-th processing stage in the d-th process step $PRO_d$ is the α-th processing stage in the j-th subtask $TA_j$.

An output power $Pn_j$ of the j-th execution unit $CL_j$ and a required power of a corresponding processing task satisfy formula (5):

$$Pn_j \in \left[\min_a \{Te_j^a Tf_j^a\}, \max_a \{Te_j^a Tf_j^a\}\right]. \tag{5}$$

The characteristic of a control method of the energy service system of the present disclosure is to be implemented as the following steps:
step 1: starting m drive units $AG_1, AG_2, \ldots, AG_i, \ldots$, $Ag_m$ in the drive system; and turning on all switches $\{SW_{ij}|i=1, 2, \ldots, m; j=1, 2, \ldots, n\}$ of the energy supply bus, so that each drive unit is in an idle state, and sending current idle states to the control center.
Step 2: defining and initializing a loop variable x=2.
Step 3: initializing d=1.
Step 4: initializing r=1.
Step 5: determining whether r+d is equal to x, if yes, performing step 6-step 9, otherwise, performing step 10.
Step 6: calculating, by utilizing formula (6), an average power $PA_d^r$ of the r-th processing stage $TAPR_{jd}^{\alpha r}$ in the d-th process step $PRO_d$:

$$PA_d^r = \int_{st_d^r}^{ct_d^r} Te_d^r Tf_d^r dt / (ct_d^r - st_d^r). \tag{6}$$

Step 7: sending, by the j-th execution unit $CL_j$, an energy service request to the control center, according to the average power $PA_d^r$ selecting, by the control center, a drive unit $AG_\zeta$ which is in the idle state and with the highest drive efficiency from a current drive system by utilizing formula (7) according to the average power $PA_d^r$, to supply energy for the j-th execution unit $CL_j$, wherein $AG_\zeta \in AG$:

$$\min \left| PR_i - \int_{st_d^r}^{ct_d^r} Te_d^r Tf_d^r dt / (ct_d^r - st_d^r) \right|. \tag{7}$$

Step 8: responding, by the drive system, to the energy service request, and turning off a switch $SW_{\zeta j}$ through which a smallest drive unit $AG_\zeta$ drives the j-th execution device $CL_j$ in the energy supply bus, so as to start to perform the processing stage $TAPR_{jd}^{\alpha r}$, and marking a state of the smallest drive unit $AG_\zeta$ as busy in the control center.

Step 9: turning on the corresponding switch $SW_{\zeta j}$ after the processing stage $TAPR_{jd}^{\alpha r}$ is completed, and marking the state of the smallest drive unit $AG_\zeta$ as idle.
Step 10: determining whether $r > k_d$ holds after assigning r+1 to r, if yes, performing step 11, otherwise, performing step 5.
Step 11: determining whether d>D holds after assigning d+1 to d, if yes, performing step 12, otherwise, performing step 4.
Step 12: determining whether $x > (\max\{k_d\}+D)$ holds after assigning x+1 to x, if yes, performing step 13, otherwise, performing step 3; and
step 13: turning off m drive units $AG_1, AG_2, \ldots$, $AG_i, \ldots, AG_m$ in the drive system, and turning off all the switches of the energy supply bus.

The present disclosure provides a design method of a multi-machine shared drive system of a production line of the present disclosure, the production line is composed of K machines, which collectively complete a production task, where, the design method is implemented as the following steps:
step 1, designing a process:
designing, according to a production task of the production line, K processes for completing the production task, and sequencing them according to a sequential order of the processes; and, calculating, according to a material to be processed, a load curve of each process, recorded as $l_1, l_2, \ldots, l_k, \ldots, l_K$, $l_k$ represents a load curve of the k-th process, k=1, 2, ..., K; letting the k-th machine process the k-th process.
Step 2, designing a task:
step 2.1: dividing, according to a load difference of the load curve of each process, each process into a plurality of processing stages, and sequencing the processing stages according to a sequential order;
step 2.2: obtaining, by utilizing formula (8), a power similarity index $Ps_\alpha$ of the α-th processing stage:

$$Ps_a = \left(\frac{\int_{st_a}^{ct_a} p_a(t) q_a(t) dt}{ct_a - st_a}\right) / \left(\max_{1 \leq a \leq A} \frac{\int_{st_a}^{ct_a} p_a(t) q_a(t) dt}{ct_a - st_a}\right), a \in \{1, 2, \ldots, A\} \tag{8}$$

in formula (8), $ct_\alpha$ and $st_\alpha$ are an end time and a start time of the α-th processing stage, respectively, $p_\alpha(t)$ is a required pressure of the α-th processing stage, $q_\alpha(t)$ is a required flow of the α-th processing stage, and A is a total number of processing stages;
step 2.3: calculating the power similarity index of each processing stage, and constituting a task by processing stages corresponding to a power similarity index within a set range, so as to obtain m tasks, recording any i-th task as $TA_i$.
Step 3, designing a schedule:
step 3.1: scheduling, by utilizing formula (9), m drive units, so that the m drive units is capable of continuously completing processing stages of a process without conflict:

$$ct(a_{l_k}^b(TA_i)) = st(a_{l_k}^{b+1}(TA_z)) \tag{9}$$

in formula (9), $l_k$ is the k-th process curve, k=1, 2, ..., K; b represents a serial number of a processing stage of the k-th process curve, $ct(\alpha_{l_k}^b(TA_i))$ is an end time of the b-th processing stage belonging to the k-th process curve $l_k$ in the i-th task $TA_i$, and $st(\alpha_{l_k}^{b+1}(TA_z))$ is a start time of the b+1-th processing stage belonging to the k-th process curve $l_k$ in the z-th task $TA_z$, z=1, 2, ..., m;

step 3.2: scheduling, by utilizing formula (10), m drive units and all processing stages in the m tasks, so that the m drive units complete an entire production task in sequence according to a set process order without conflict:

$$ct(a_{l_k}^{last}(TA_i)) \leq st(a_{l_{k+1}}^{1}(TA_z)) \qquad (10)$$

in formula (10), ct $(a_{l_k}^{last}(TA_i))$ is an end time of the last processing stage belonging to the k-th process curve $l_k$ in the i-th task $TA_i$, and $st(\alpha_{l_{k+1}}^{1}(TA_z))$ is a start time of the first processing stage belonging to the k+1-th process curve in the z-th task TAX.

Step 4, designing a drive unit:

step 4.1: designing, according to the required pressure and the required flow of each processing stage in the i-th task $TA_i$, the i-th drive unit $DU_i$, which completes all processing stages in the i-th task $TA_i$, and is composed of the i-th group of motors and the i-th group of pumps, i=1, 2, ..., m; m represents a total number of drive units;

step 4.2: selecting, from a set collection of pumps and for the i-th drive unit $DU_i$, a hydraulic pump with the smallest rated displacement and using as the i-th basic flow unit $Q_i$; when a corresponding task is completed, an output pressure of the i-th basic flow unit $Q_i$ is recorded as $p_i$, an output flow is recorded as $q_i$, an output power is recorded as $P_{Qi}$, and an energy efficiency is recorded as $\eta_i$;

step 4.3: selecting, from the set collection of motors, a motor that matches the i-th basic flow unit $Q_i$, so that a load rate of the selected motor when driving a corresponding task is within a set interval, so as to obtain a basic motor unit $D_i$ in the i-th drive unit $DU_i$; and obtaining, by utilizing formula (11), a load rate $\beta_i$ of the basic motor unit $D_i$ when driving a corresponding action:

$$\beta_i = P_{Qi}/(P_{Di} \times \eta_i) \qquad (11)$$

in formula (11), $P_{Di}$ is a rated power of the i-th basic motor unit $D_i$.

Step 5, designing a shared drive system:

step 5.1: obtaining, by utilizing formula (12), a maximum value $MAX_i$ of the i-th basic flow unit $Q_i$, and increasing the number of the i-th basic flow unit $Q_i$ in the i-th drive unit $DU_i$, to a set maximum value $MAX_i$ one by one:

$$MAX_i = [Q_{max}/Q_i] + 1 \qquad (12)$$

in formula (12), $Q_{max}$ is a maximum flow value output by a single machine;

step 5.2: increasing sequentially the number of the i-th basic motor unit $D_i$ one by one, and matching it with the i-th basic flow unit $Q_i$;

step 5.3: calculating a time $t_i^{n_i}(k)$ and an energy consumption $E_i^{n_i}(k)$ for completing a corresponding task of the k-th machine, wherein $n_i$ is the number of the i-th basic flow unit $Q_i$ added in the i-th drive unit $DU_i$, $n_i=1, 2, ..., MAX_i$;

step 5.4: obtaining, by utilizing formula (13), the total configuration schemes number M of the m drive units:

$$M = \prod_{i=1}^{m} MAX_i \qquad (13)$$

step 5.5: making, by scheduling run time and idle time of drive units in each configuration scheme, the m drive units complete processing stages in all tasks successively and sequentially, and forming M scheduling schemes, so as to utilize formula (14) to obtain a total time $T_j$ of the j-th scheduling scheme:

$$T_j = \sum_{i=1}^{m} t_i^{n_i}(k)_j + t(idle)_j \qquad (14)$$

in formula (14), $t_i^{n_i}(k)_j$ is a time for the i-th drive unit $DU_i$ in the j-th scheduling scheme to complete a corresponding task of the k-th machine, $t(idle)_j$ is a total unloading time of all drive units in the j-th scheduling scheme, j=1, 2, ..., M;

step 5.6: obtaining, by utilizing formula (15), a total energy consumption $E_j$ of the j-th scheduling scheme:

$$E_j = \sum_{k=1}^{K} \sum_{i=1}^{m} E_i^{n_i}(k)_j + E(idle)_j \qquad (15)$$

in formula (15), K is a total number of machines in the production line, $E_i^{n_i}(k)_j$ is an energy consumption of the i-th drive unit $DU_i$ in the j-th scheduling scheme to complete the corresponding task of the k-th machine, and $E(idle)_j$ is a total unloading energy consumption of all drive units in the j-th scheduling scheme;

step 5.7: selecting, from the total time and the total energy consumption of M scheduling schemes, m drive units corresponding to a scheduling scheme with less total time and total energy consumption and using as a drive system shared by K machines, so as to achieve efficient production.

The characteristics of the design method of a multi-machine shared drive system of a production line according to the present disclosure further lie in:

calculating a sum of theoretical displacement of all basic flow units in the i-th drive unit $DU_i$ in the shared drive system; and selecting, from the set collection of pumps, a single pump having large displacement, whose theoretical displacement is equal to the sum of the theoretical displacement of all basic flow units in the i-th drive unit $DU_i$, to replace all basic flow units in the i-th drive unit $DU_i$, and to serve as a pump of the i-th drive unit;

selecting, from the set collection of motors, a motor that matches the pump of the i-th drive unit $DU_i$ and using as a motor in the i-th drive unit, a load rate of the motor in the i-th drive unit $DU_i$ when driving a corresponding task is within a set interval, so that an energy efficiency of the selected motor when driving the corresponding task is not lower than a set efficiency value, so as to achieve a high efficiency operation.

Compared with the prior art, the beneficial effects of the present disclosure are as follows:

1. The present disclosure centrally supplies energy service through the drive system, and completes all stages of the processing task with high energy efficiency corresponding to energy request of each duty stage in the task, thereby improving the energy efficiency of the production line.

2. The present disclosure improves the matching degree between the drive system and the task, and reduces the energy consumption of the production line, by combining a plurality of stages into one task according to the similarity of power requirement, selecting the execution unit that matches the power requirement of the corresponding task, and selecting the drive unit that is capable of supplying energy service with high efficiency for all stages of the corresponding task.
3. The present disclosure achieves dynamic scheduling of energy supply in a production process, achieves further matching of energy in a manufacturing process and improves the flexibility of the multi-machine production line, by combining request for energy service and response to energy service.
4. The present disclosure reduces the energy consumption during a processing process of the production line and improves the energy efficiency of the production line by sharing the drive system with a plurality of machines in the production line, and designing the shared drive system including a plurality of drive units with a higher matching degree with the task load of the production line.
5. The present disclosure improves the matching degree between each drive unit and the task load, thereby reduces the energy consumption of the production line by combining stages of process curves of tasks of the production line into a plurality of tasks according to the range of a power requirement index and designing a drive unit that efficiently completes the corresponding task.
6. The present disclosure forms a plurality of configuration schemes for each drive unit by increasing the number of basic flow units in the drive unit to the set maximum value one by one, and forms a plurality of operation scheduling schemes of the production line, and improves the energy efficiency and work efficiency of the production line by selecting a drive unit combination, whose total time and total energy consumption in a work cycle are less, as the shared drive system.
7. The present disclosure further improves the energy efficiency of the shared drive system of the production line, by adopting a single hydraulic pump with large displacement to replace a plurality of pumps having small displacement with a total displacement equal to the displacement of the hydraulic pump, and utilizes characteristics of large-capacity motors whose energy efficiency is higher than small-capacity motors under the same load.

DESCRIPTION OF EMBODIMENTS

Figure 1:
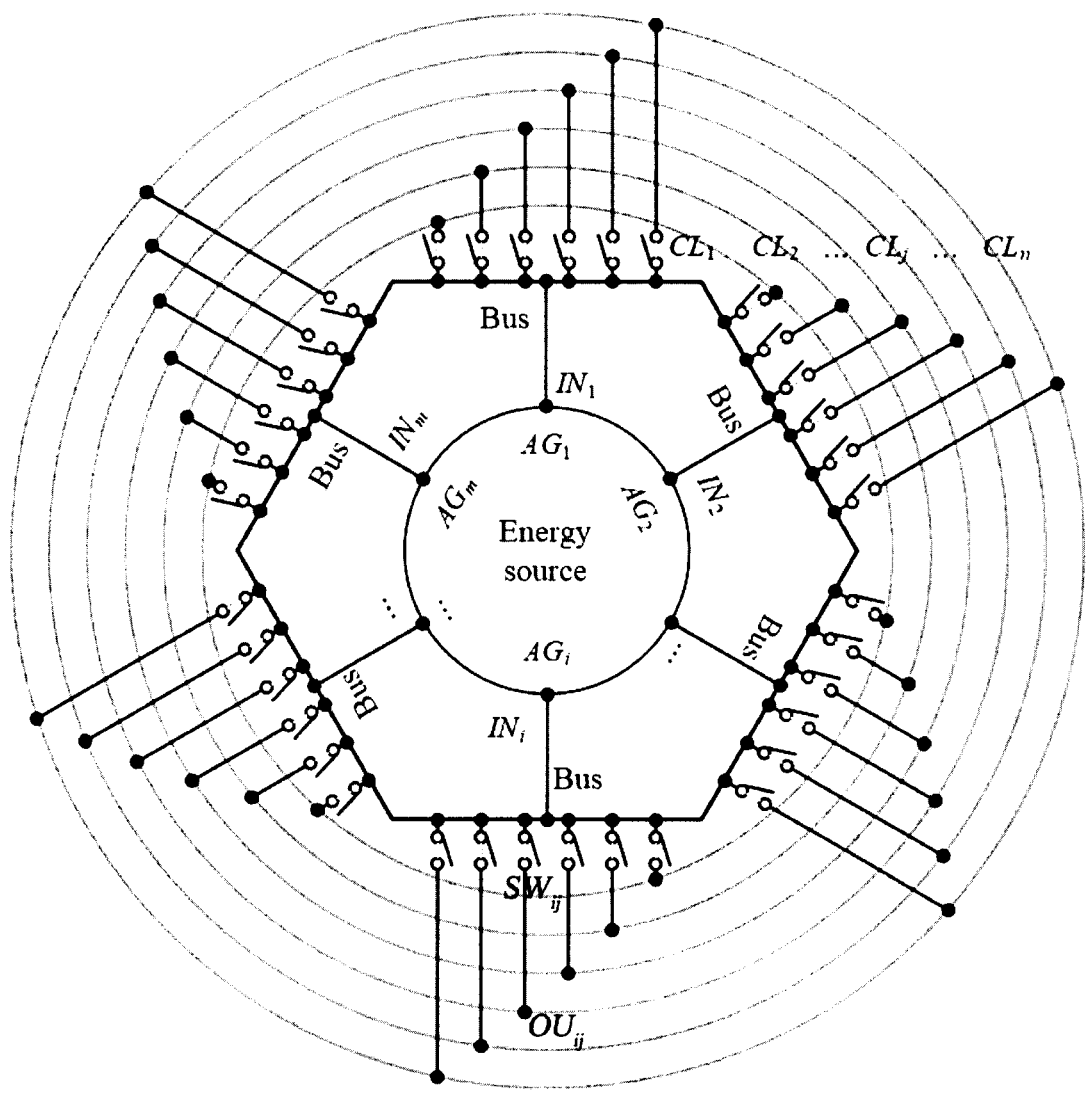
FIG. 1 is a schematic diagram which shows a drive system, an execution device and an energy supply bus according to the present disclosure.

Embodiment 1: an energy service system of a multi-machine production line includes: a drive system, an execution device, an energy supply bus and a control center;
the drive system is composed of m drive units, AG={$AG_1$, $AG_2, \ldots, AG_i, \ldots, AG_m$}, and is configured to supply energy for the execution device, where, $AG_i$ represents the i-th drive unit, i∈{1, 2, . . . , m}; a rated power of the i-th drive unit $AG_i$ is recorded as $PR_i$; the composition of a drive unit is configured according to an energy form required by the execution device, the output energy form can be hydraulic energy or mechanical energy, and implementation forms are a motor-pump and an electric motor, respectively.
The execution device is composed of n execution units, CL={$CL_1, CL_2, \ldots, CL_j, \ldots, CL_n$}, and is configured to complete a processing task in the production line, where, $CL_j$ represents the j-th execution unit, j∈{1, 2, . . . , n}; the execution unit is a mechanical structure part of a machine tool.
The control center is configured to monitor and control on-off state of each drive unit and the energy supply bus, which is implemented by real-time monitoring and controlling each component of the system.
The energy supply bus is composed of m independent units, and is configured to convert an output energy form of the i-th drive unit $AG_i$ into an energy form required by the j-th execution unit; and each independent unit is made to consist of an inlet A end and an outlet B end, wherein, the inlet A end connected to the i-th drive unit $AG_i$ is recorded as $IN_i$, and, the outlet B end corresponding to the i-th inlet A end $IN_i$ has n outlets, which are sequentially connected to the first execution unit $CL_1$ to the n-th execution unit $CL_n$, where, an outlet connected to the j-th execution unit $CL_j$ is recorded as $OU_{ij}$; and, a switch $SW_{ij}$ is provided on the outlet $OU_{ij}$, and when the switch $SW_{ij}$ is off, the i-th inlet A end $IN_i$ is connected to the outlet $OU_{ij}$, and the i-th drive unit $AG_i$ is capable of supplying energy for the j-th execution unit $CL_j$; as shown in FIG. 1.
The processing task is made to composed of n subtasks, TA={$TA_1, TA_2, \ldots, TA_j, \ldots, TA_n$}, where $TA_j$ represents the j-th subtask; the j-th subtask $TA_j$ completes processing on the j-th execution unit $CL_j$; the j-th subtask $TA_j$ is composed of processing stages with similar power requirements in $k_j$ different processes, where a power similarity $Sm_j^\alpha$ of any α-th processing stage is obtained by formula (1), and satisfies formula (2):

$$Sm_j^\alpha = \left( \frac{\int_{st_j^\alpha}^{ct_j^\alpha} Te_j^\alpha Tf_j^\alpha dt}{ct_j^\alpha - st_j^\alpha} \right) \Big/ \left( \frac{\sum_{a=1}^{k_j} \int_{st_j^\alpha}^{ct_j^\alpha} Te_j^\alpha Tf_j^\alpha dt}{\sum_{a=1}^{k_j} ct_j^\alpha - st_j^\alpha} \right) \quad (1)$$

$$Sm_j^\alpha \in Sy_j \quad (2)$$

in formula (1), $ct_j^\alpha$ and $st_j^\alpha$ are an end time and a start time of the α-th processing stage, $Te_j^\alpha$ is an effort required by the α-th processing stage, $Tf_j^\alpha$ is a flow required by the α-th processing stage, a∈{1, 2, . . . , $k_j$};
in formula (2), $Sy_j$ is a range of a j-th given power similarity, and between [0, 1].
the process is composed of D process steps {$PRO_1$, $PRO_2, \ldots, PRO_d, \ldots, PRO_D$}, where $PRO_d$ represents the d-th process step, the d-th process step $PRO_d$ is made to include $k_d$ processing stages, and to satisfy formula (3):

$$\sum_{d=1}^{D} k_d = \sum_{j=1}^{n} k_j. \quad (3)$$

The processing stages of the d-th process step $PRO_d$ are completed sequentially and successively, and satisfies formula (4):

$$ct_d^\alpha = st_d^{\alpha+1} \quad (4)$$

$TAPR_{jd}^{\alpha r}$ is made to represent that the r-th processing stage in the d-th process step $PRO_d$ is the α-th processing stage in the j-th subtask $TA_j$.

An output power $Pn_j$ of the j-th execution unit $CL_j$ and a required power of a corresponding processing task satisfy formula (5):

$$Pn_j \in \left[\min_a \{Te_j^a Tf_j^a\}, \max_a \{Te_j^a Tf_j^a\}\right]. \quad (5)$$

Figure 2:
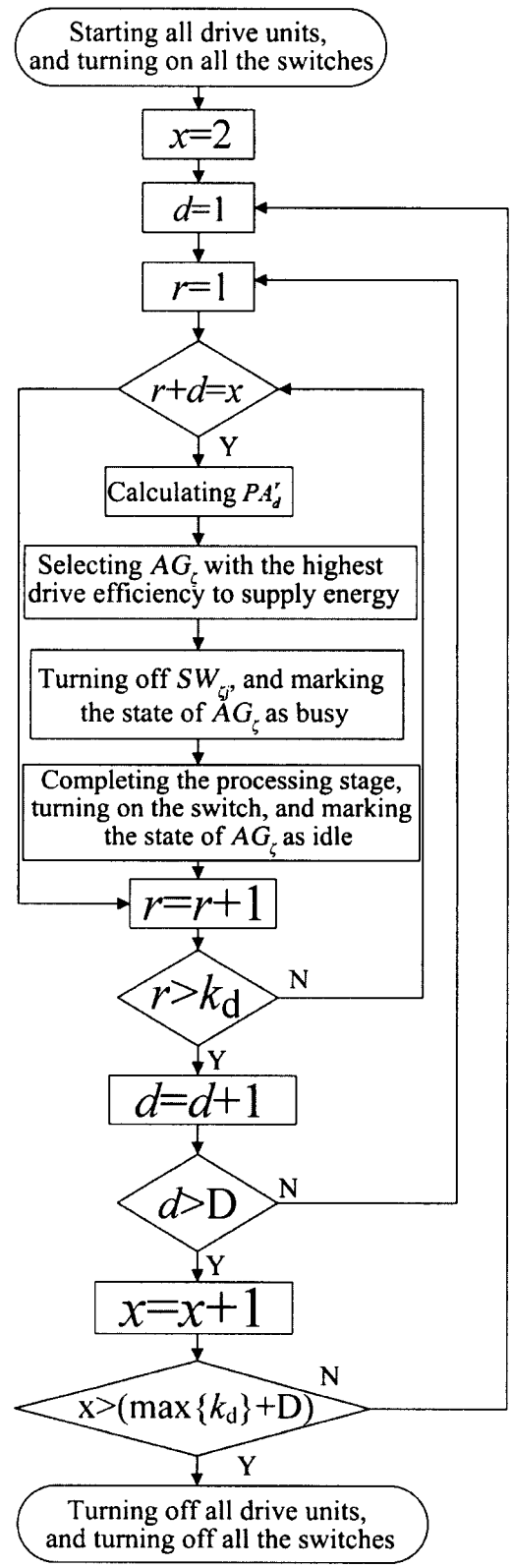
FIG. 2 is a flow chart which shows a control method of the energy service system according to the present disclosure.

In the present embodiment, as shown in FIG. 2, a control method of the energy service system is implemented as the following steps:

step 1: starting m drive units $AG_1, AG_2, \ldots, AG_i, \ldots, AG_m$ in the drive system; and turning on all switches $\{SW_{ij}|i=1, 2, \ldots, m; j=1, 2, \ldots, n\}$ of the energy supply bus, so that each drive unit is in an idle state, and sending current idle states to the control center;

Step 2: defining and initializing a loop variable x=2.

Step 3: initializing d=1.

Step 4: initializing r=1.

Step 5: determining whether r+d is equal to x, if yes, performing step 6-step 9, otherwise, performing step 10.

Step 6: calculating, by utilizing formula (6), an average power $PA_d^r$ of the r-th processing stage $TAPR_{jd}^{\alpha r}$ in the d-th process step $PRO_d$:

$$PA_d^r = \int_{st_d^r}^{ct_d^r} Te_d^r Tf_d^r dt / (ct_d^r - st_d^r). \quad (6)$$

Step 7: sending, by the j-th execution unit $CL_j$, an energy service request to the control center, according to the average power $PA_d^r$; selecting by the control center, a drive unit $AG_\zeta$ which is in the idle state and with the highest drive efficiency from a current drive system by utilizing formula (7) according to the average power $PA_d^r$ to supply energy for the j-th execution unit $CL_j$, where $AG_\zeta \in AG$:

$$\min \left| PR_i - \int_{st_d^r}^{ct_d^r} Te_d^r Tf_d^r dt / (ct_d^r - st_d^r) \right|. \quad (7)$$

Step 8: responding, by the drive system, to the energy service request, and turning off a switch $SW_{\zeta j}$ through which a smallest drive unit $AG_\zeta$ drives the j-th execution device $CL_j$ in the energy supply bus, so as to start to perform the processing stage $TAPR_{jd}^{\alpha r}$, and marking a state of the smallest drive unit $AG_\zeta$ as busy in the control center.

Step 9: turning on the corresponding switch $SW_{\zeta j}$ after the processing stage $TAPR_{jd}^{\alpha r}$ is completed, and marking the state of the smallest drive unit $AG_\zeta$ as idle.

Step 10: determining whether $r>k_d$ holds after assigning r+1 to r, if yes, performing step 11, otherwise, performing step 5.

Step 11: determining whether d>D holds after assigning d+1 to d, if yes, performing step 12, otherwise, performing step 4.

Step 12: determining whether $x>(\max\{k_d\}+D)$ holds after assigning x+1 to x, if yes, performing step 13, otherwise, performing step 3; and step 13: turning off m drive units $AG_1, AG_2, \ldots, AG_i, AG_m$ in the drive system, and turning off all the switches of the energy supply bus. At the end of the task, the state of each switch can be set to be on or off according to the requirement of a drive unit.

Figure 3:
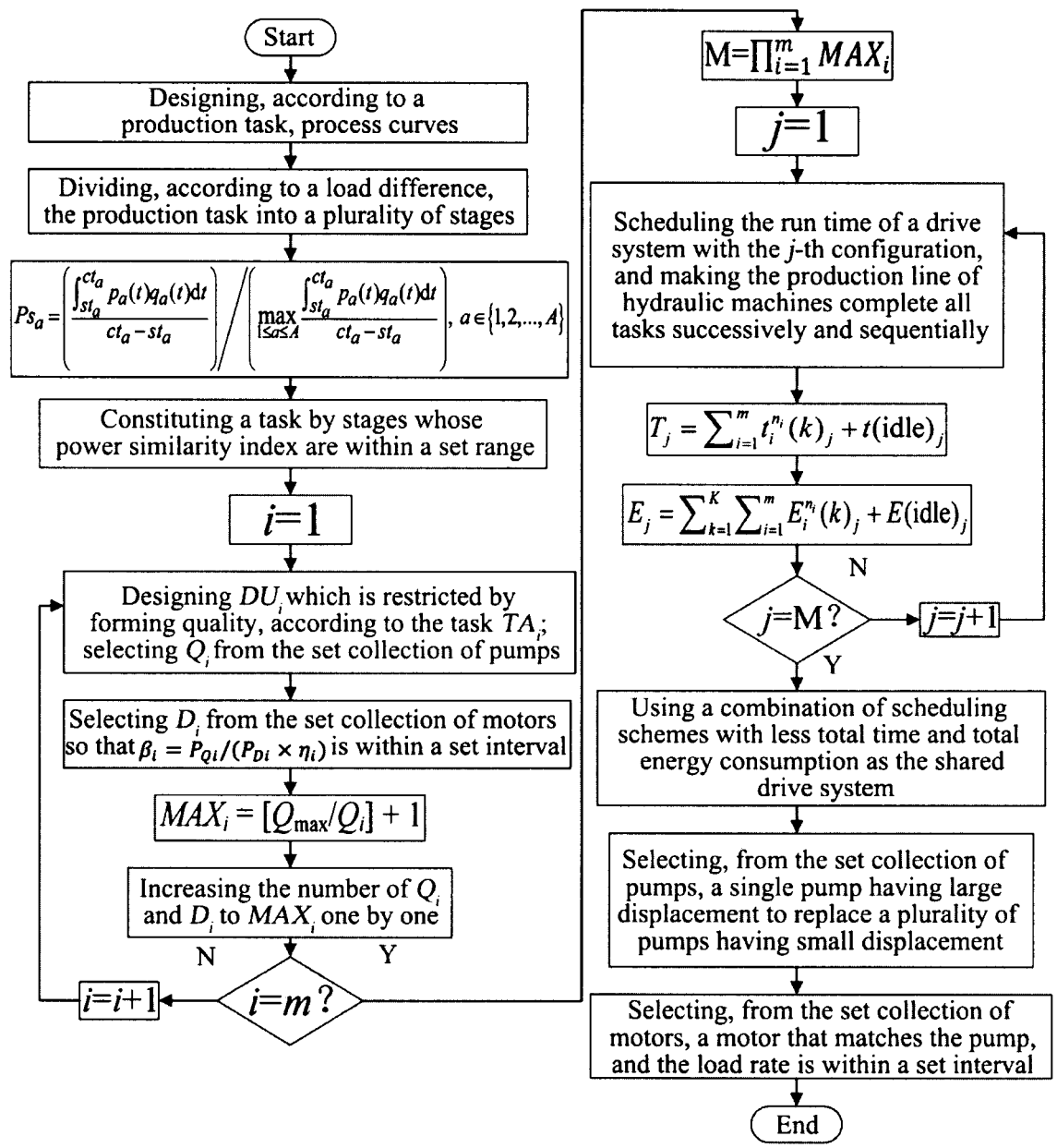
FIG. 3 is a flow chart which shows a design method of a multi-machine shared drive system of a production line according to the present disclosure.

Embodiment 2: a production line is composed of K machines, which collectively complete a production task, a plurality of machines share one drive system, the one drive system supplies the energy required for all machines to complete a production task, the shared drive system is composed of a plurality of drive units, each of the drive units has different installed power; a flow chart of a design method of a multi-machine shared drive system of a production line is shown in FIG. 3, and the design method is implemented as the following steps:

step 1, designing a process:

designing, according to a production task of the production line, K processes for completing the production task, and sequencing them according to a sequential order of the processes; and, calculating, according to a material to be processed, a load curve of each process, recorded as $l_1, l_2, \ldots, l_k, \ldots, l_K$, $l_k$ represents a load curve of the k-th process, k=1, 2, ..., K; letting the k-th machine process the k-th process.

Step 2, designing a task:

step 2.1: dividing, according to a load difference of the load curve of each process, each process into a plurality of processing stages, and sequencing the processing stages according to a sequential order; in a production process, each processing stage is completed with high energy efficiency by a drive unit with a higher matching degree the same;

step 2.2: obtaining, by utilizing formula (8), a power similarity index $Ps_\alpha$ of the α-th processing stage:

$$Ps_\alpha = \left(\frac{\int_{st_\alpha}^{ct_\alpha} p_\alpha(t)q_\alpha(t)dt}{ct_\alpha - st_\alpha}\right) / \left(\max_{1 \le a \le A} \frac{\int_{st_a}^{ct_a} p_a(t)q_a(t)dt}{ct_a - st_a}\right), a \in \{1, 2, \ldots, A\} \quad (8)$$

in formula (8), $ct_\alpha$ and $st_\alpha$ are an end time and a start time of the α-th processing stage, respectively, $p_\alpha(t)$ is a required pressure of the α-th processing stage, $q_\alpha(t)$ is a required flow of the α-th processing stage, and A is a total number of processing stages;

step 2.3: calculating the power similarity index of each processing stage, and constituting a task by processing stages corresponding to a power similarity index within a set range, so as to obtain m tasks, recording any i-th task as $TA_i$.

Step 3, designing a schedule:

step 3.1: scheduling, by utilizing formula (9), m drive units, so that them drive units is capable of continuously completing processing stages of a process without conflict:

$$ct(\alpha_{l_k}^b(TA_i)) = st(\alpha_{l_k}^{b+1}(TA_z)) \quad (9)$$

in formula (9), $l_k$ is the k-th process curve, k=1, 2, ..., K; b represents a serial number of a processing stage of the k-th process curve, $ct(\alpha_{l_k}^b(TA_i))$ is an end time of the b-th processing stage in the k-th process curve $l_k$ in the i-th task $TA_i$, and $st(\alpha_{l_k}^{b+1}(TA_z))$ is a start time of the b+1-th processing stage belonging to the k-th process curve $l_k$ in the z-th task $TA_z$, z=1, 2, ..., m;

step 3.2: for all processes, since some processes can only be performed after a specific process is completed, scheduling, by utilizing formula (10), m drive units and all processing stages in the m tasks, so that the m drive units complete an entire production task in sequence according to a set process order without conflict:

$$ct(a_{l_k}^{last}(TA_i)) \leq st(a_{l_{k+1}}^1(TA_z)) \tag{10}$$

in formula (10), $ct(\alpha_{l_k}^{last}(TA_i))$ is an end time of the last processing stage belonging to the k-th process curve $l_k$ in the i-th task $TA_i$, and $st(\alpha_{l_k}^1(TA_z))$ is a start time of the first processing stage belonging to the k+1-th process curve in the z-th task $TA_z$;

Step 4, designing a drive unit:

step 4.1: designing, according to the required pressure and the required flow of each processing stage in the i-th task $TA_i$, the i-th drive unit $DU_i$, which completes all processing stages in the i-th task $TA_i$, and is composed of the i-th group of motors and the i-th group of pumps, i=1, 2, . . . , m; m represents a total number of drive units;

step 4.2: selecting, from a set collection of pumps and for the i-th drive unit $DU_i$ a hydraulic pump with the smallest rated displacement to be used as the i-th basic flow unit $Q_i$; when a corresponding task is completed, an output pressure of the i-th basic flow unit $Q_i$ is recorded as $p_i$, an output flow is recorded as $q_i$, an output power is recorded as $P_{Qi}$, and an energy efficiency is recorded as $\eta_i$;

step 4.3: selecting, from the set collection of motors, a motor that matches the i-th basic flow unit $Q_i$, so that a load rate of the selected motor when driving a corresponding task is within a set interval, so as to obtain a basic motor unit $D_i$ in the i-th drive unit $DU_i$; and obtaining, by utilizing formula (11), a load rate $\beta_i$ of the basic motor unit $D_i$ when driving a corresponding action:

$$\beta_i = P_{Qi}/(P_{Di} \times \eta_i) \tag{11}$$

in formula (11), $P_{Di}$ is a rated power of the i-th basic motor unit $D_i$.

Step 5, designing a shared drive system:

step 5.1: obtaining, by utilizing Formula (12), a maximum value MAX of the i-th basic flow unit and increasing the number of the i-th basic flow unit $Q_i$ in the i-th drive unit $DU_i$ to a set maximum value $MAX_i$ one by one:

$$MAX_i = [Q_{max}/Q_i] + 1 \tag{12}$$

in formula (12), $Q_{max}$ is a maximum flow value output by a single machine;

step 5.2: increasing sequentially the number of the i-th basic motor unit $D_i$ one by one, and matching it with the i-th basic flow unit $Q_i$;

step 5.3: calculating a time $t_i^{n_i}(k)$ and an energy consumption $E_i^{n_i}(k)$ for completing a corresponding task of the k-th machine, wherein, $n_i$ is the number of the i-th basic flow unit $Q_i$ added in the i-th drive unit $DU_i$, $n_i = 1$, 2, . . . , $MAX_i$;

step 5.4: obtaining, by utilizing formula (13), the total configuration schemes number M of the m drive units:

$$M = \prod_{i=1}^{m} MAX_i \tag{13}$$

step 5.5: making, by scheduling run time and idle time of drive units in each configuration scheme, the m drive units complete processing stages in all tasks successively and sequentially, and forming M scheduling schemes, so as to utilize formula (14) to obtain a total time $T_j$ of the j-th scheduling scheme:

$$T_j = \sum_{i=1}^{m} t_i^{n_i}(k)_j + t(\text{idle})_j \tag{14}$$

in formula (14), $t_i^{n_i}(k)_j$ is a time for the i-th drive unit $DU_i$ in the j-th scheduling scheme to complete a corresponding task of the k-th machine, $t(\text{idle})_j$ is a total unloading time of all drive units in the j-th scheduling scheme, j=1, 2, . . . , M;

step 5.6: obtaining, by utilizing formula (15), a total energy consumption $E_j$ of the j-th scheduling scheme:

$$E_j = \sum_{k=1}^{K} \sum_{i=1}^{m} E_i^{n_i}(k)_j + E(\text{idle})_j \tag{15}$$

in formula (15), K is a total number of machines in the production line, $E_i^{n_i}(k)_j$ is an energy consumption of the i-th drive unit $DU_i$ in the j-th scheduling scheme to complete the corresponding task of the k-th machine, and $E(\text{idle})_j$ is a total unloading energy consumption of all drive units in the j-th scheduling scheme;

step 5.7: selecting, from the total time and the total energy consumption of M scheduling schemes, m drive units corresponding to scheduling schemes with less total time and total energy consumption and using it as the drive system shared by K machines, so as to achieve efficient production.

With respect to the shared drive system of a production line designed by the design method according to the present disclosure, calculating a sum of theoretical displacement of all basic flow units in the i-th drive unit $DU_i$ in the shared drive system; and selecting, from the set collection of pumps, a single pump having large displacement, whose theoretical displacement is equal to the sum of the theoretical displacement of all basic flow units in the i-th drive unit $DU_i$, to replace all basic flow units in the i-th drive unit $DU_i$ and to serve as a pump of the i-th drive unit;

selecting, from the set collection of motors, a motor that matches the pump of the i-th drive unit $DU_i$ and using it as a motor in the i-th drive unit, a load rate of the motor in the i-th drive unit $DU_i$ when driving a corresponding task is within a set interval, so that an energy efficiency of the selected motor when driving the corresponding task is not lower than a set efficiency value, so as to achieve a high efficiency operation.

Taking a production line of hydraulic presses as an example, the production line has four hydraulic presses, each hydraulic actuator has the same parameters, configured to collectively complete a production task of a housing of a certain clutch. A multi-machine shared drive system of the production line is designed according to the following steps:

step 1, designing a process:

designing, according to the production task, 4 processes, and letting them sequenced according to a sequential order of processing; each hydraulic press completes a process correspondingly.

Step 2, designing a task:
dividing, according to a load difference of a load curve of each process, each process into 5 processing stages, the time duration, the required pressure and the required flow of each processing stage of each process are shown in Table 1, in which, the required flow and the required pressure of an unloading stage and a standby stage of each process are zero.

TABLE 1

| | Processing stage | | | | | | | | | |
|---|---|---|---|---|---|---|---|---|---|---|
| | Falling | | | Forming | | | Unloading | Returning | | Standby |
| Process | Time (s) | Pressure (MPa) | Flow (L/min) | Time (s) | Pressure (MPa) | Flow (L/min) | Time (s) | Time (s) | Pressure (MPa) | Flow (L/min) | Time (s) |
| $l_1$ | 2.5 | 2.66 | 114 | 0.50 | 16 | 46.44 | 1.88 | 2.21 | 2.87 | 65.46 | 2.91 |
| $l_2$ | 2.5 | 2.66 | 114 | 1.50 | 8.46 | 45.10 | 0.64 | 2.46 | 2.87 | 65.46 | 2.90 |
| $l_3$ | 2.5 | 2.66 | 114 | 0.50 | 9.94 | 45.76 | 1.83 | 2.22 | 2.87 | 65.46 | 2.95 |
| $l_4$ | 2.5 | 2.66 | 114 | 0.50 | 7.67 | 46.94 | 1.88 | 2.14 | 2.87 | 65.46 | 2.98 |

The processing stages of each process are sequenced according to a sequential order, and formula (8) is utilized to calculate a power similarity index of each processing stage, as shown in Table 2.

TABLE 2

| | Power similarity index | | | | | | | | | |
|---|---|---|---|---|---|---|---|---|---|---|
| Process | Falling | | Forming | | Unloading | | Returning | | Standby | |
| $l_1$ | Processing stage 1 | 0.41 | Processing stage 2 | 1 | Processing stage 3 | 0 | Processing stage 4 | 0.25 | Processing stage 5 | 0 |
| $l_2$ | Processing stage 6 | 0.41 | Processing stage 7 | 0.51 | Processing stage 8 | 0 | Processing stage 9 | 0.25 | Processing stage 10 | 0 |
| $l_3$ | Processing stage 11 | 0.41 | Processing stage 12 | 0.61 | Processing stage 13 | 0 | Processing stage 14 | 0.25 | Processing stage 15 | 0 |
| $l_4$ | Processing stage 16 | 0.41 | Processing stage 17 | 0.48 | Processing stage 18 | 0 | Processing stage 19 | 0.25 | Processing stage 20 | 0 |

Constituting a task by processing stages with the power similarity index in an interval [0.3, 0.45], in other words, processing stages 1, 6, 11 and 16 constitute task 1, recorded as $TA_1$; constituting a task by processing stages with the power similarity index in an interval [0.46, 1], in other words, processing stages 2, 7, 12 and 17 constitute task 2, recorded as $TA_2$; constituting a task by processing stages with the power similarity index in a range [0, 0.3], in other words, processing stages 4, 9, 14 and 19 constitute task 3, recorded as $TA_3$; constituting a task by processing stages with the power similarity index equal to 0, in other words, processing stages 3, 5, 8, 10, 13, 15, 18 and 20 constitute task 4, recorded as $TA_4$. As a result, four tasks are obtained, and each task is completed by one drive unit, and the shared drive system includes four drive units.

Step 3, designing a schedule:
completing, by scheduling the four drive units and all the processing stages in the four tasks, each process according to the order of the processing stages in the process, and at the same time, completing the entire production task according to the order of processes 1, 2, 3 and 4.

Step 4, designing a drive unit:
designing, according to the required pressure and the required flow of each processing stage in the i-th task $TA_i$, the i-th drive unit $DU_i$ which completes all the processing stages in the i-th task $TA_i$. Selecting, from the set collection of pumps (a certain series of plunger pumps with constant power), the basic flow unit of each drive unit. Afterwards, selecting, according to the selected basic flow unit, a basic motor unit that matches it; setting the load rate of the selected basic motor unit when driving a corresponding task to be within an interval [0.4, 1.0], and the selection results are shown in Table 3. Since the loads of the fourth task are all zero and the fourth drive unit does not need to provide energy, the configuration within the fourth drive unit is empty. With respect to PV023 plunger pump, the minimum flow is 40 L/min when its pressure is 2.66 MPa, the minimum flow is 35 L/min when the pressure is 2.87 MPa; with respect to PV032 plunger pump, the minimum flow is 24 L/min when the pressure is 16 MPa.

TABLE 3

| Drive unit | 1st Drive unit | 2nd Drive unit | 3rd Drive unit | 4th Drive unit |
|---|---|---|---|---|
| Basic flow unit | PV023 | PV032 | PV023 | — |
| Basic motor unit | Y112M | Y160M | Y112M | — |

Step 5, designing a shared drive system:
with respect to the four hydraulic presses of the production line, the maximum flow output by a single machine is 120 L/min, and, based on formulas (12)-(13), a total of 60 configuration schemes for 4 drive units are calculated. By scheduling run time and idle time of drive units in each configuration scheme, the 4 drive units is made to complete processing stages in all tasks successively and sequentially, so as to form 60 scheduling schemes.

Formulas (14)-(15) are utilized to calculate a total time and a total energy consumption of each scheduling scheme, 4 drive units corresponding to scheduling schemes with less total time and total energy consumption are selected as the drive system shared by 4 machines, the configuration of the shared drive system is shown in Table 4.

TABLE 4

| Shared drive system | 1st Drive unit | 2nd Drive unit | 3rd Drive unit | 4th Drive unit |
|---|---|---|---|---|
| Number of basic flow units | 3 | 2 | 2 | — |
| Number of basic motor units | 3 | 2 | 2 | — |
| Total time (s) | | 40 | | |
| Total energy consumption (kJ) | | 170.59 | | |

TABLE 5

| Shared drive system | 1st Drive unit | 2nd Drive unit | 3rd Drive unit | 4th Drive unit |
|---|---|---|---|---|
| Pump | PV063 | PV046 | PV032 | — |
| Motor | Y160M | Y160L | Y132S | — |

Calculating, for the designed shared drive system of a multi-machine production line, a sum of theoretical displacement of all basic flow units in each drive unit; selecting, from the set collection of pumps, a single pump having large displacement whose theoretical displacement is equal to the sum of the theoretical displacement of basic flow units in the i-th drive unit to replace all basic flow units in the i-th drive unit and to serve as a pump of the i-th drive unit; and, selecting, from the set collection of motors, a motor that matches the pump of the i-th drive unit, so that a load rate of the motor when driving the corresponding task is within an interval [0.4, 1.0], in order to make a selected motor complete the corresponding task with high efficiency, the selection results are shown in Table 5.

What is claimed is:

1. A design method of a multi-machine shared drive system of a production line, the production line being composed of K machines, which collectively complete a production task, wherein the design method is implemented as the following steps:

step 1, designing a process:
designing, according to a production task of the production line, K processes for completing the production task, and sequencing them according to a sequential order of the processes; calculating, according to a material to be processed, a load curve of each process, recorded as $l_1, l_2, \ldots, l_k, \ldots, l_K$, wherein $l_k$ represents a load curve of the k-th process, k=1, 2, . . . , K; and letting the k-th machine process the k-th process;

step 2, designing a task:
step 2.1: dividing, according to a load difference of the load curve of each process, each process into a plurality of processing stages, and sequencing the processing stages according to a sequential order;
step 2.2: obtaining, by utilizing formula (8), a power similarity index $Ps_\alpha$ of the α-th processing stage:

$$Ps_a = \left( \frac{\int_{st_a}^{ct_a} p_a(t) q_a(t) dt}{ct_a - st_a} \right) \Big/ \left( \max_{1 \leq a \leq A} \frac{\int_{st_a}^{ct_a} p_a(t) q_a(t) dt}{ct_a - st_a} \right), a \in \{1, 2, \ldots, A\} \quad (8)$$

in formula (8), $ct_\alpha$ and $st_\alpha$ are an end time and a start time of the α-th processing stage, respectively, $p_\alpha(t)$ is a required pressure of the α-th processing stage, $q_\alpha(t)$ is a required flow of the α-th processing stage, and A is a total number of processing stages;
step 2.3: calculating the power similarity index of each processing stage, and constituting a task by processing stages corresponding to a power similarity index within a set range, so as to obtain m tasks, recording any i-th task as $TA_i$;

step 3, designing a schedule:
step 3.1: scheduling, by utilizing formula (9), m drive units, so that the m drive units are capable of continuously completing processing stages of a process without conflict:

$$ct(a_{l_k}^b(TA_i)) = st(a_{l_k}^{b+1}(TA_z)) \quad (9)$$

in formula (9), $l_k$ is the k-th process curve, k=1, 2, . . . , K; b represents a serial number of a processing stage of the k-th process curve $ct(a_{l_k}^b(TA_i))$ is an end time of the b-th processing stage belonging to the k-th process curve $l_k$ in the i-th task $TA_i$, and $st(a_{l_k}^{b+1}(TA_z))$ is a start time of the b+1-th processing stage belonging to the k-th process curve $l_k$ in the z-th task $TA_z$, z=1, 2, . . . , m;
step 3.2: scheduling, by utilizing formula (10), m drive units and all processing stages in the m tasks, so that the m drive units complete an entire production task in sequence according to a set process order without conflict:

$$ct(a_{l_k}^{last}(TA_i)) \leq st(a_{l_{k+1}}^1(TA_z)) \quad (10)$$

in formula (10), $ct(a_{l_k}^{last}(TA_i))$ is an end time of the last processing stage belonging to the k-th process curve $l_k$ in the i-th task $TA_i$, and $st(a_{l_{k+1}}^1(TA_z))$ is a start time of the first processing stage belonging to the k+1-th process curve in the z-th task $TA_z$;

step 4, designing a drive unit:
step 4.1: designing, according to the required pressure and the required flow of each processing stage in the i-th task $TA_i$, the i-th drive unit $DU_i$ which completes all processing stages in the i-th task $TA_i$, and is composed of the i-th group of motors and the i-th group of pumps, i=1, 2, . . . , m; m represents a total number of drive units;
step 4.2: selecting, from a set collection of pumps and for the i-th drive unit $DU_i$, a hydraulic pump with the smallest rated displacement and using as the i-th basic flow unit $Q_i$; when a corresponding task is completed, an output pressure of the i-th basic flow unit $Q_i$ is recorded as $p_i$, an output flow is recorded as $q_i$, an output power is recorded as $P_{Qi}$, and an energy efficiency is recorded as $\eta_i$;
step 4.3: selecting, from the set collection of motors, a motor that matches the i-th basic flow unit $Q_i$, so that a load rate of the selected motor when driving a corresponding task is within a set interval, so as to obtain a basic motor unit $D_i$ in the i-th drive unit $DU_i$; and obtaining, by utilizing formula (11), a load rate $\beta_i$ of the basic motor unit $D_i$ when driving a corresponding action:

$$\beta_i = P_{Qi}/(P_{Di} \times \eta_i) \quad (11)$$

in formula (11), $P_{Di}$ is a rated power of the i-th basic motor unit $D_i$;

step 5, designing a shared drive system:

step 5.1: obtaining, by utilizing formula (12), a maximum value $MAX_i$ of the i-th basic flow unit $Q_i$, and increasing the number of the i-th basic flow unit $Q_i$ in the i-th drive unit $DU_i$ to a set maximum value $MAX_i$ one by one:

$$MAX_i = [Q_{max}/Q_i] + 1 \quad (12)$$

in formula (12), $Q_{max}$ is a maximum flow value output by a single machine;

step 5.2: increasing sequentially the number of the i-th basic motor unit $D_i$ one by one, and matching it with the i-th basic flow unit $Q_i$;

step 5.3: calculating a time $t_i^{n_i}(k)$ and an energy consumption $E_i^{n_i}(k)$ for completing a corresponding task of the k-th machine, wherein $n_i$ is the number of the i-th basic flow unit $Q_i$ added in the i-th drive unit $DU_i$, $n_i = 1, 2, \ldots, MAX_i$;

step 5.4: obtaining, by utilizing formula (13), the total configuration schemes number M of the m drive units:

$$M = \prod_{i=1}^{m} MAX_i \quad (13)$$

step 5.5: making, by scheduling run time and idle time of drive units in each configuration scheme, the m drive units complete processing stages in all tasks successively and sequentially, and forming M scheduling schemes, so as to utilize formula (14) to obtain a total time $T_j$ of the j-th scheduling scheme:

$$T_j = \sum_{i=1}^{m} t_i^{n_i}(k)_j + t(idle)_j \quad (14)$$

in formula (14), $t_i^{n_i}(k)_j$ is a time for the i-th drive unit $DU_i$ in the j-th scheduling scheme to complete a corresponding task of the k-th machine, $t(idle)_j$ is a total unloading time of all drive units in the j-th scheduling scheme, $j = 1, 2, \ldots, M$;

step 5.6: obtaining, by utilizing formula (15), a total energy consumption $E_j$ of the j-th scheduling scheme:

$$E_j = \sum_{k=1}^{K} \sum_{i=1}^{m} E_i^{n_i}(k)_j + E(idle)_j \quad (15)$$

in formula (15), K is a total number of machines in the production line, $E_i^{n_i}(k)_j$ is an energy consumption of the i-th drive unit $DU_i$ in the j-th scheduling scheme to complete the corresponding task of the k-th machine, and $E(idle)_j$ is a total unloading energy consumption of all drive units in the j-th scheduling scheme;

step 5.7: selecting, from the total time and the total energy consumption of M scheduling schemes, m drive units corresponding to a scheduling scheme with less total time and total energy consumption and using as a drive system shared by K machines, so as to achieve efficient production.

2. The design method according to claim 1, further comprising:

calculating a sum of theoretical displacement of all basic flow units in the i-th drive unit $DU_i$, in the shared drive system; and selecting, from the set collection of pumps, a single pump having large displacement, whose theoretical displacement is equal to the sum of the theoretical displacement of all basic flow units in the i-th drive unit $DU_i$, to replace all basic flow units in the i-th drive unit $DU_i$ and to serve as a pump of the i-th drive unit; and selecting, from the set collection of motors, a motor that matches the pump of the i-th drive unit $DU_i$ and using as a motor in the i-th drive unit, a load rate of the motor in the i-th drive unit $DU_i$ when driving a corresponding task is within a set interval, so that an energy efficiency of the selected motor when driving the corresponding task is not lower than a set efficiency value, so as to achieve a high efficiency operation.

* * * * *